J. T. HANNA.
GEARING.
APPLICATION FILED OCT. 4, 1910.
1,044,781.
Patented Nov. 19, 1912.
2 SHEETS—SHEET 2.
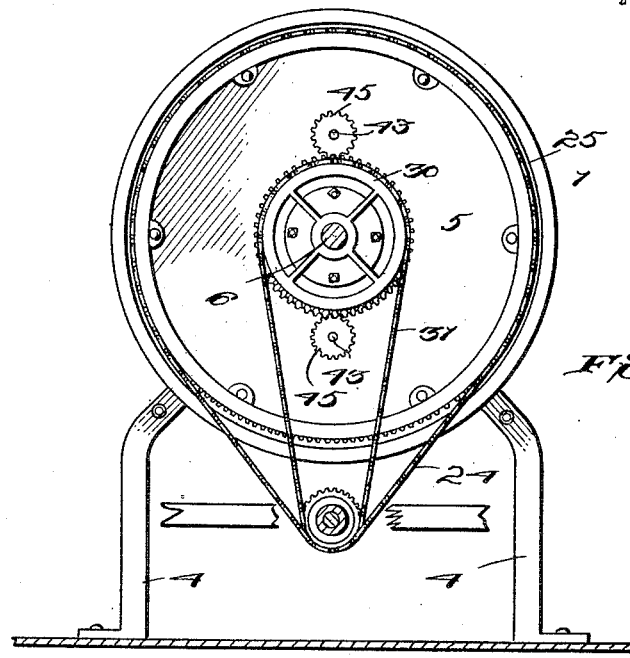
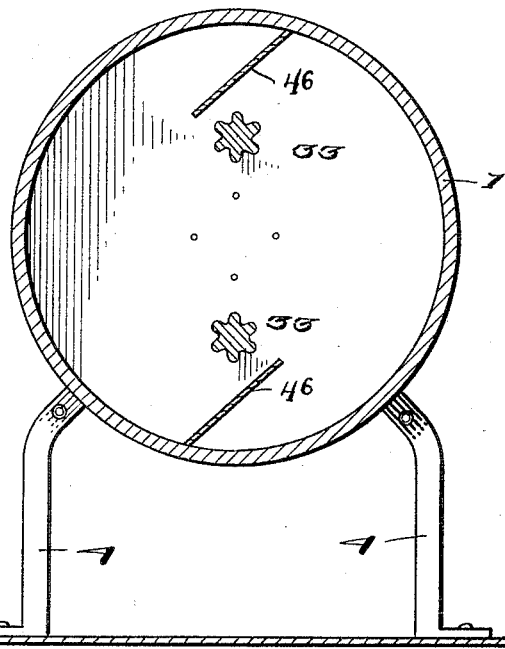
Witnesses
Inventor
John T. Hanna
By C. E. Vrooman,
his Attorney

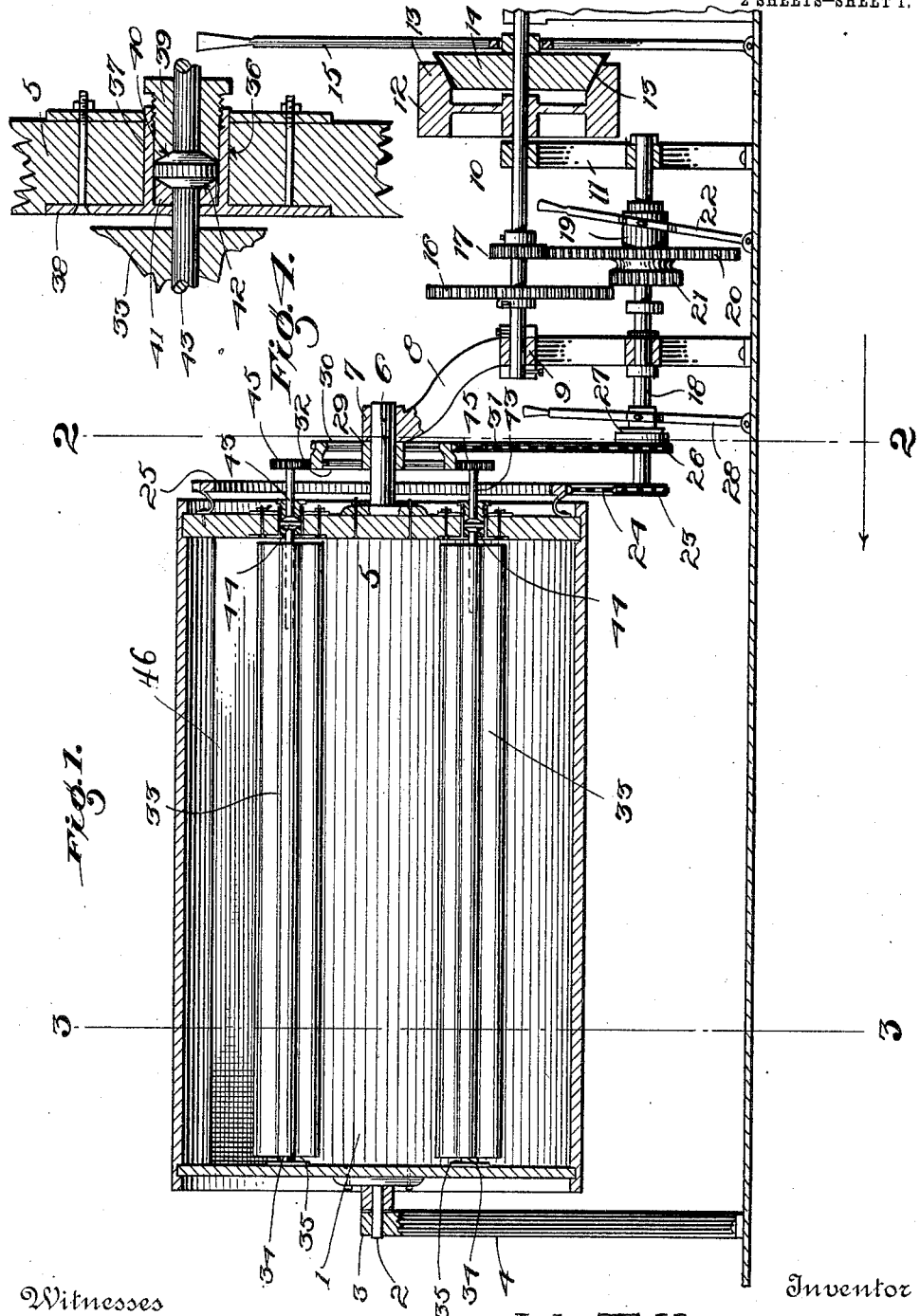

UNITED STATES PATENT OFFICE.

JOHN T. HANNA, OF ALGONA, IOWA.

GEARING.

1,044,781.   Specification of Letters Patent.   Patented Nov. 19, 1912.

Application filed October 4, 1910. Serial No. 585,254.

*To all whom it may concern:*

Be it known that I, JOHN T. HANNA, a citizen of the United States of America, residing at Algona, in the county of Kossuth and State of Iowa, have invented certain new and useful Improvements in Gearing, of which the following is a specification, reference being had therein to the accompanying drawing.

This invention relates to churns, and the principal object of the same is to provide the churn with novel dashers and coöperating blades and also to provide novel means for rotating the churn body and the dashers in opposite directions, said means being controlled manually and including suitable gearing for varying the speed of the same.

In carrying out the objects of the invention generally stated above, it will be understood, of course, that the essential features thereof are necessarily susceptible of changes in details and structural arrangements, a preferred and practical embodiment of which is shown in the accompanying drawings wherein:—

Figure 1 is a view in central vertical longitudinal section of the improved churn. Fig. 2 is a transverse vertical sectional view taken on the line 2—2, Fig. 1. Fig. 3 is a similar view taken on the line 3—3, Fig. 1. Fig. 4 is a fragmentary view of the head of the churn body showing the manner of journaling the dasher shafts therein.

The improved churn comprises a body 1 that is in the form of a drum, the rear end carrying a stub shaft 2 that is journaled in a bearing 3 carried by the supporting standards 4. The other end of the body is provided with a head 5 from which a stub shaft 6 projects, said shaft being journaled in an end bearing 7 carried by the standards 8. Standards 8 carry an intermediate bearing 9 in which one end of a power shaft 10 is journaled, said shaft 10 being also journaled in a standard bearing 11 and having a pulley 12 loose thereon adapted for belt connection with a source of power (not shown). Pulley 12 is beveled as at 13 to provide a clutch member that is frictionally engaged by a clutch disk 14 slidable on shaft 10 to lock the pulley to said shaft. The disk 14 is operated by a hand lever 15 to be engaged with or disengaged from the pulley 12. Shaft 10 is also provided with a large gear 16 and a small gear 17, both of said gears being adjustable on said shaft.

Standards 8 and 11 have a transmission shaft 18 that is parallel with power shaft 10 and has a hub 19 slidable thereon. Said hub carries a large gear 20 and a small gear 21 and is operated by a hand lever 22 to selectively engage gear 20 with gear 17, or gear 21 with gear 16 to cause shaft 18 to travel fast or slow. At the end of shaft 18 adjacent the head of the body 1, said shaft carries a sprocket wheel 23 which has a chain connection 24 with a sprocket ring 25 carried by the head 5. Adjacent sprocket wheel 23, shaft 18 carries a loose sprocket wheel 26 that is adapted to be locked to said shaft 18 by means of a clutch 27 operated by a hand lever 28. Stub shaft 6 has a hub 29 loose thereon which carries a sprocket 30 that has a chain connection 31 with sprocket 26. Hub 29 also carries a pinion 32.

A pair of longitudinally corrugated dashers 33 are arranged in parallel relation in the body 1, the rear ends of said dashers being provided with stub shafts 34 which are journaled in bearings 35 carried by the inner surface of the rear end of said body. The head 5 has transverse openings 36 formed through it and through which the cylindrical casings 37 of the plates 38 project. Said plates 38 are detachably fastened to the inner surface of head 5 and the open ends of casings 37 project beyond the outer surface of said head. Said open ends are internally threaded for the reception of the externally threaded bearing plugs 39, the inner ends of which are provided with a conical recess 40. Within the inner portion of casings 37 blocks 41 are seated having recessed ends 42 complemental to the recessed ends of the plugs 39, and which coöperate therewith to provide bearing chambers. The plugs 39, blocks 41, and the inner ends of the casings 37 are provided with alined openings through which the stub shafts 43 of the dashers 33 project. The central portions of said shafts are provided with bearing flanges 44 that are rotatable in the bearing chambers, and the outer ends of said shafts are equipped with pinions 45 which are in mesh with the pinion 32 of hub 29.

Within the body 1 a pair of inclined blades 46 are arranged, one of said blades being adjacent each dasher, and said blades coöperating with said dashers to thoroughly work the material being churned.

With this invention it will be seen that through the described gearing, the dashers and the body can be rotated rapidly or slowly, and through the loose sprocket 26 of shaft 18 and the clutch 27, power to the dasher rotating gears can be cut off when desired so that the dashers will be idle while the body 1 is being rotated.

It will also be seen that the described manner of journaling the stub shafts of the dashers in the head 5 provides simple means whereby adjustments can be readily made to compensate for wear.

What I claim as my invention is:—

In combination, a rotatable device, a plurality of rotatable members carried thereby, a driving shaft, a pulley on said shaft, a clutch to clutch said pulley to said shaft, bearings supporting said shaft, a relatively small gear on said shaft, a relatively large gear spaced from the small gear on said shaft, a second shaft, a bearing supporting the second shaft, a relatively large gear on the second shaft, a relatively small gear on the second shaft, said last-mentioned gears being connected together, a collar on said large gear, a shipper lever in operative relation to said collar to move the last mentioned gears on the second shaft, stop collars fixed on the second shaft to restrict movement of the last mentioned gears whereby said gears may be selectively engaged by the gears on the first shaft, a stub shaft adapted for carrying the rotatable device, a bearing for said stub shaft, a sprocket on the stub shaft and rotatable with reference thereto, a sprocket on the second shaft rotatable with reference thereto, a clutch for connecting the sprocket on said second shaft to said shaft, a plurality of gears adapted for connection to rotatable members carried by said rotatable device, a gear connected to the first-mentioned sprocket and adapted to mesh with the gears of said rotatable members, a sprocket adapted for connection with the rotatable device, a second sprocket on the second shaft, and a chain connecting the last mentioned sprockets.

In testimony whereof I hereunto affix my signature in presence of two witnesses.

JOHN T. HANNA.

Witnesses:
J. W. SULLIVAN,
CARRIE STALEY.